(12) United States Patent
Ward

(10) Patent No.: US 7,821,411 B1
(45) Date of Patent: Oct. 26, 2010

(54) SAFETY DEVICE FOR MONITORING A CONDUIT

(75) Inventor: Charles Barry Ward, Alpharetta, GA (US)

(73) Assignee: Diversitech Corporation, Duluth, GA (US)

( * ) Notice: Subject to any disclaimer, the term of this patent is extended or adjusted under 35 U.S.C. 154(b) by 544 days.

(21) Appl. No.: 11/673,166

(22) Filed: Feb. 9, 2007

Related U.S. Application Data

(60) Provisional application No. 60/771,971, filed on Feb. 9, 2006.

(51) Int. Cl.
*G08B 21/00* (2006.01)
(52) U.S. Cl. .......................... 340/616; 340/608; 73/304
(58) Field of Classification Search ................. 340/616, 340/608, 606, 603, 620, 686.684, 540, 500; 73/861.12, 304 R, 304 C, 112.01, 54.24; 324/661, 629, 690
See application file for complete search history.

(56) References Cited

U.S. PATENT DOCUMENTS

| | | | |
|---|---|---|---|
| 4,392,128 A | 7/1983 | Young et al. | |
| 4,470,008 A | 9/1984 | Kato | |
| 4,937,559 A | 6/1990 | Meacham et al. | |
| 5,028,910 A | 7/1991 | Meacham et al. | |
| 5,069,042 A | 12/1991 | Stuchlik, III | |
| 5,166,667 A * | 11/1992 | Jen | 340/606 |
| 5,196,729 A | 3/1993 | Thorngren | |
| 5,367,292 A * | 11/1994 | Szoke et al. | 340/608 |
| 5,522,229 A | 6/1996 | Stuchlik, III et al. | |
| 5,621,393 A | 4/1997 | Urich | |
| 5,627,523 A | 5/1997 | Besprozvanny et al. | |
| 5,699,049 A | 12/1997 | Difiore | |
| 5,898,376 A | 4/1999 | Webb | |
| 5,965,814 A | 10/1999 | French et al. | |
| 6,040,776 A * | 3/2000 | Glover et al. | 340/618 |
| 6,154,144 A | 11/2000 | Johnson | |
| 6,292,104 B1 | 9/2001 | Wakabayashi | |
| 6,442,955 B1 | 9/2002 | Oakner | |
| 6,526,807 B1 | 3/2003 | Doumit et al. | |
| 6,661,514 B1 * | 12/2003 | Tevs et al. | 356/337 |
| 6,683,535 B1 | 1/2004 | Utke | |
| 7,091,868 B2 * | 8/2006 | Ku et al. | 340/603 |
| 2002/0000093 A1 | 1/2002 | Lea | |
| 2003/0000303 A1* | 1/2003 | Livingston et al. | 73/304 C |

(Continued)

FOREIGN PATENT DOCUMENTS

JP 402 304 128 12/1990

*Primary Examiner*—George A Bugg
(74) *Attorney, Agent, or Firm*—Smith Gambrell & Russell LLP

(57) ABSTRACT

A noninvasive security device for detection of blocked fluid flow within a conduit includes clamping body that may be affixed to the conduit and a safety overflow circuit mounted to the clamping body. The safety overflow circuit includes first and second sensor pads that act as the metal plates of a capacitor. The sensor pads are connected to the clamping body and positioned proximate the conduit to measure the capacitance within the conduit. The capacitance will be low when water is freely flowing through the conduit, since the dielectric constant will be similar to that of air. However, when the water level increases in the conduit, the dielectric constant will increase as will the capacitance, such that a pulse signal is generated to notify the user of the occlusion and to further disable the source of the water to the conduit.

20 Claims, 5 Drawing Sheets

U.S. PATENT DOCUMENTS

2004/0036618 A1* 2/2004 Ku et al. .................... 340/618
2005/0166613 A1 8/2005 Oakner et al.
2007/0063856 A1* 3/2007 Gibson ...................... 340/608

* cited by examiner

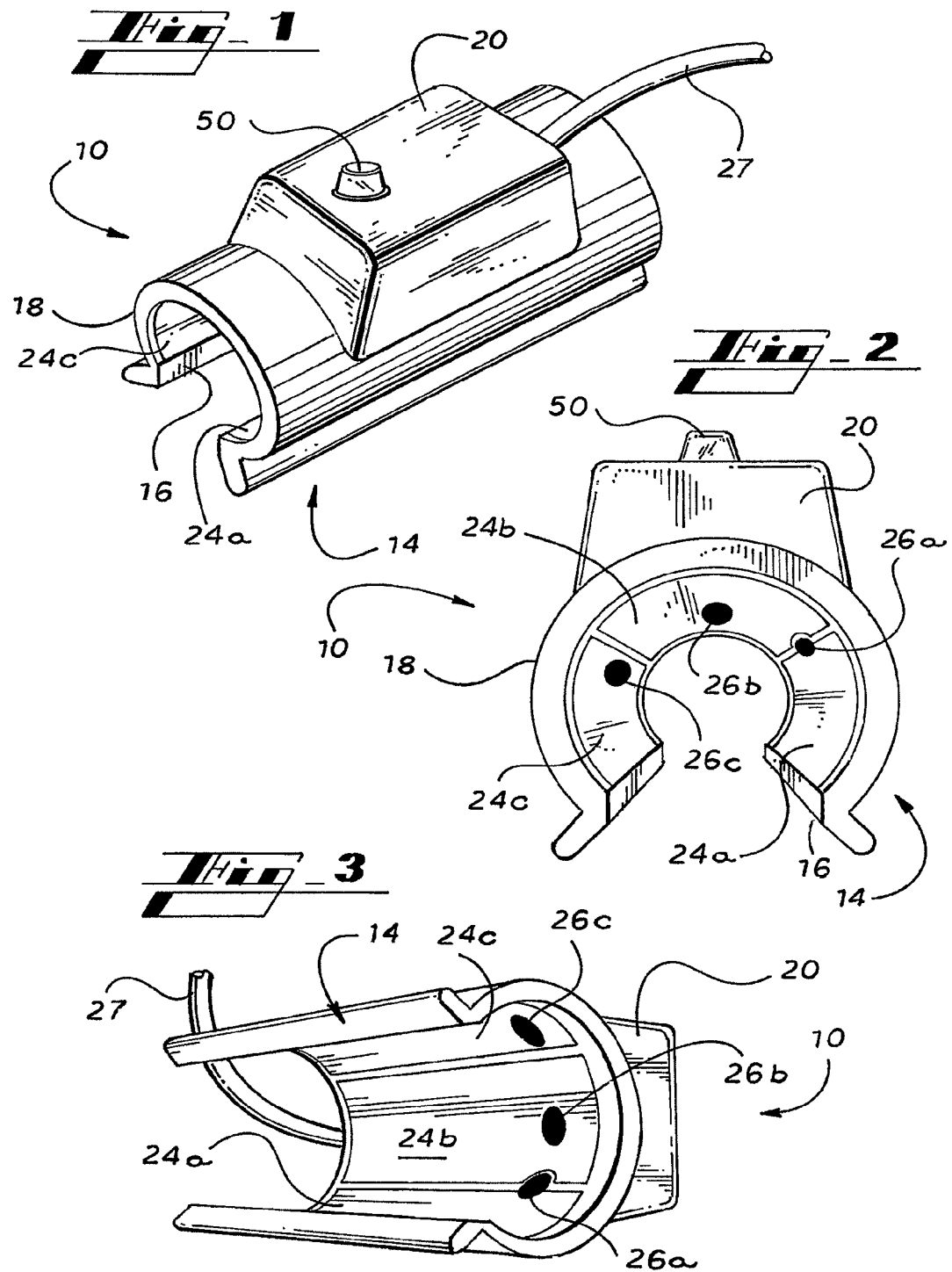

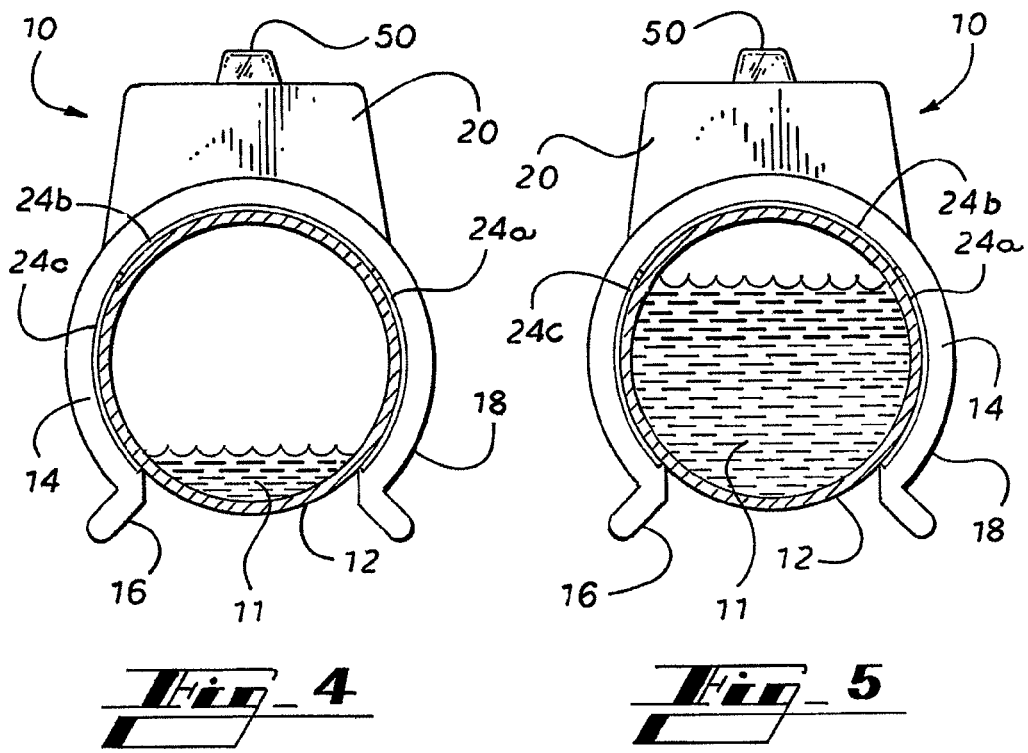
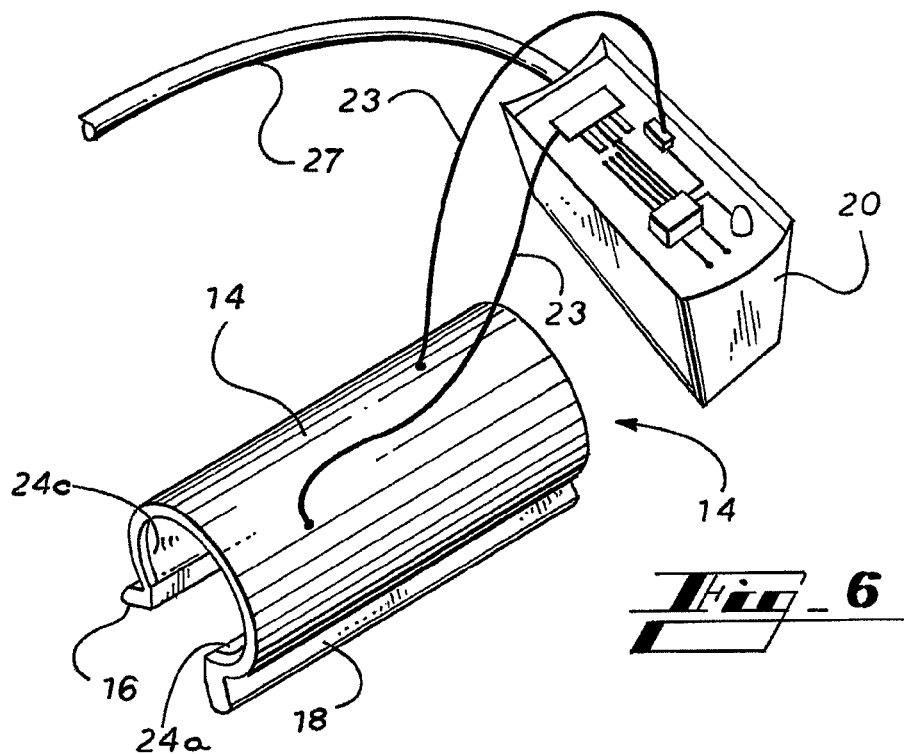

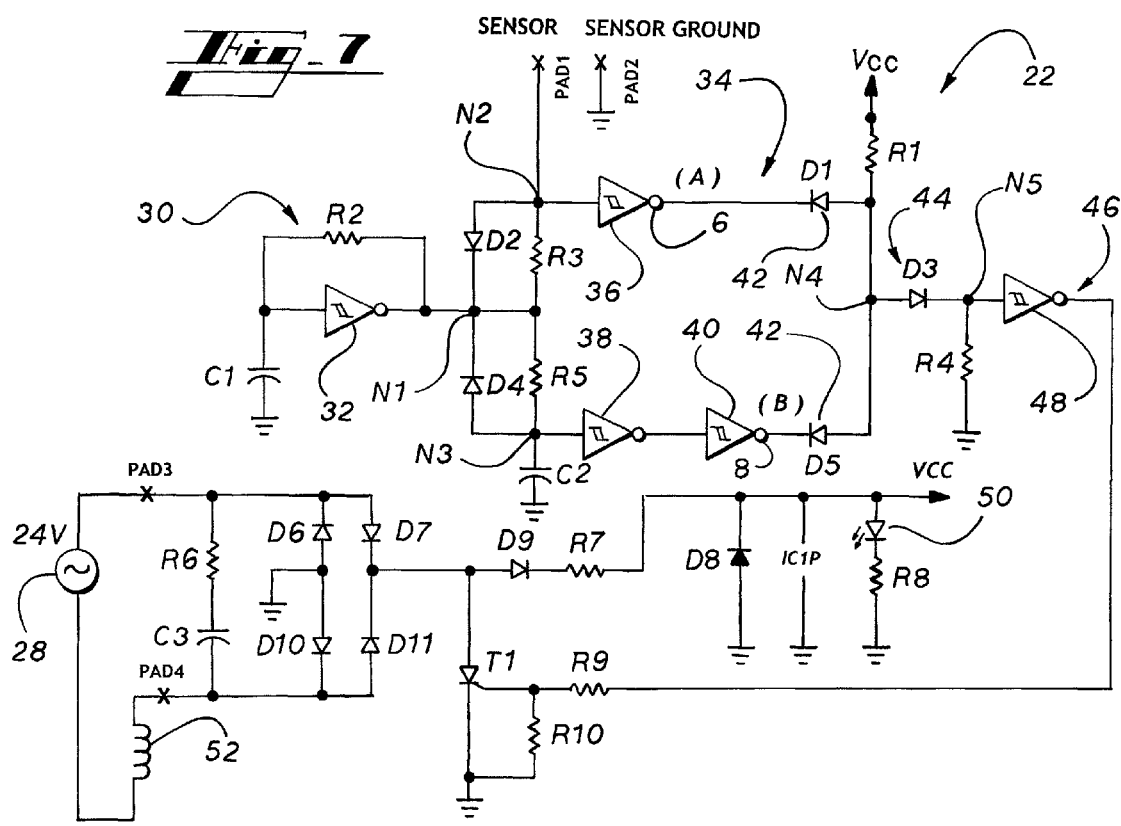

Pin 6
Pin 8
Ref.
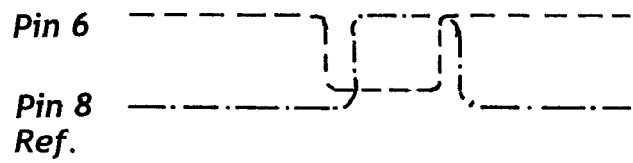
Pin 6
Pin 8
Resultant
Pulse
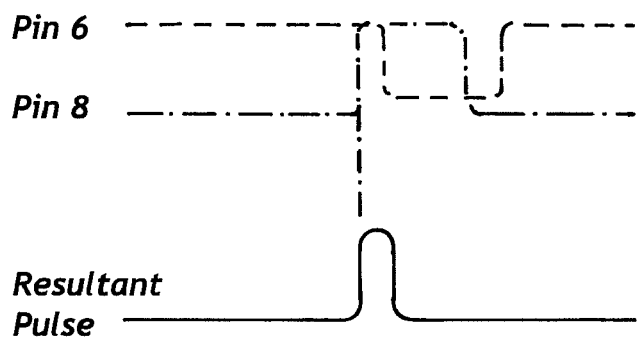
Pin 6
ON
Pin 6
OFF
Ref.
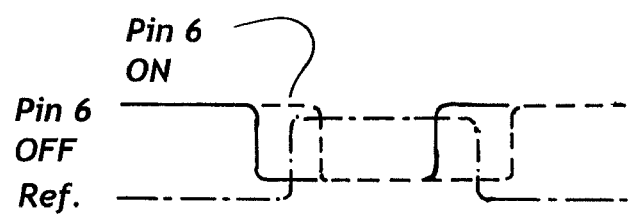

US 7,821,411 B1

SAFETY DEVICE FOR MONITORING A CONDUIT

CROSS REFERENCE TO RELATED PATENT APPLICATIONS

This patent application claims priority from U.S. Provisional Patent Application No. 60/771,971, filed on Feb. 9, 2006, which is hereby incorporated by reference.

FIELD OF THE INVENTION

The present invention relates to a safety device for determining when an occlusion is present within a conduit. More particularly, the present invention relates to a safety device that monitors the level of water in a drainpipe or other conduit to determine when an obstruction is present and correspondingly notifying a user. Even more particularly, the present invention relates to a noninvasive solid-state safety device clamped onto a drainpipe that senses when condensate is blocked in a drainpipe created by the increased capacitance of the blocked condensate.

BACKGROUND OF THE INVENTION

Many air conditioning and refrigeration units employ an evaporator coil to dehumidify and cool ambient air in a building. Typically, the evaporator coil is located inside the housing of the furnace of the air conditioning unit, and is made up of refrigerant piping loops. The evaporator coil is colder than the air being conditioned, so it condenses water liquid continuously while in operation. A condensate drain pan is typically installed below the evaporator coil, such that when the furnace fan blows air across and through the evaporator coil, the refrigerant piping loops will cool the air. During this process, water vapor in the air will condense to liquid and collect on the evaporator coil. The water (or condensate) will therefore drip from the evaporator coils into the drain pan below. The drain pan has one or more outlet ports, and a drainpipe is attached to these outlet ports for outflow of the condensate from the drain pan to a location outside of the housing.

Ideally, the condensate will drain through the drain pan outlets and through the drainpipe away from the drain pan. However, the drainpipe can often become occluded by algae, mold, mildew, dirt, or other debris, which can result in the blockage of the drainpipe. This blockage in the drainpipe prevents the condensate liquid from emptying from the drain pan, which further results in drain pan overflows. Typical drain pans are only about an inch deep, so it does not take long for the water to overflow from the drain pan when the drainpipe is clogged. Such overflows from the drain pan can cause water damage in the surrounding areas. Consequently, it is important for the owner to know about any potential drainpipe obstructions at the earliest possible time.

BRIEF DESCRIPTION OF THE DRAWINGS

A safety device for monitoring a conduit embodying the features of the present invention is depicted in the accompanying drawings, which form a portion of this disclosure, wherein:

FIG. 1 is a perspective top view of the safety device of the present invention;

FIG. 2 is a perspective side view of the safety device illustrated in FIG. 1;

FIG. 3 is a perspective bottom view of the safety device illustrated in FIG. 1;

FIG. 4 is a side elevational view of the present invention attached to a conduit freely draining condensate;

FIG. 5 is a side elevational view of the present invention attached to an occluded conduit;

FIG. 6 is an exploded view of the safety device of the present invention;

FIG. 7 is circuit diagram of the safety overflow circuit used in the present invention;

FIGS. 9-13 are illustrations of pulses passing through the safety overflow circuit of the safety device.

DETAILED DESCRIPTION OF THE PREFERRED EMBODIMENT

Figure 8:
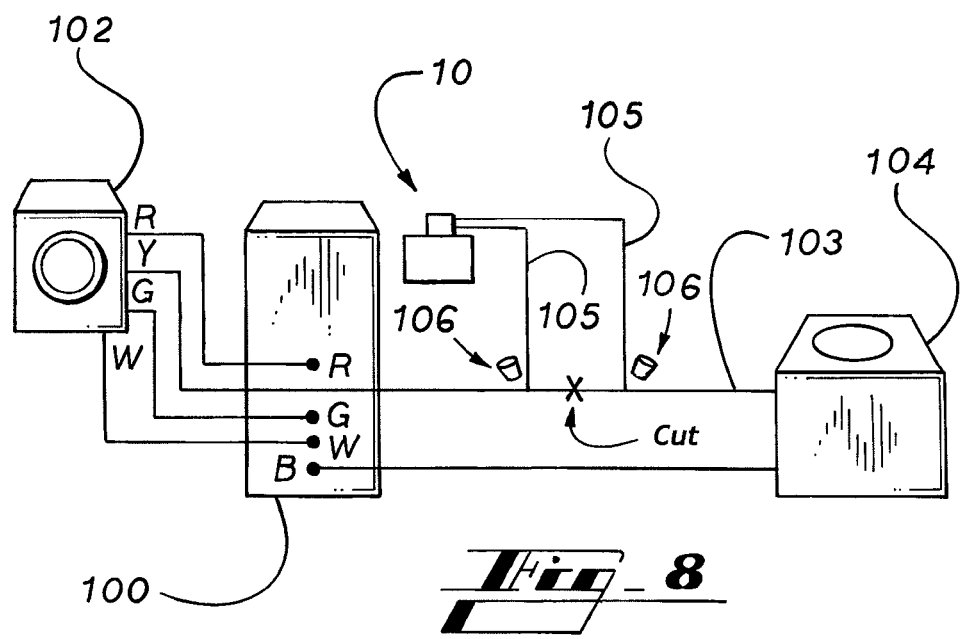
FIG. 8 is a block diagram of the safety device incorporated between an air conditioning unit and a compressor.

Looking to FIGS. 1-8, the present invention is a safety device 10 that may be affixed to a drainpipe 12 or other similar conduit to notify the user when water 11 or some other condensate is backed-up within the drainpipe 12 for any reason, such as an obstruction within the drainpipe 12 caused by the accumulation of algae, mold, mildew, dirt, or other debris. In addition to notifying the user regarding the occlusion in the drainpipe 12, the safety device 10 may further disable operation of the source of the condensation into the drainpipe 12, such as a compressor 104 (see FIG. 8), to limit the water 11 distributed through drainpipe 12 until the obstruction has been substantially removed.

The safety device 10 is designed to be attached or clamped onto the outer surface of the drainpipe 12 for monitoring the flow of water 11, or lack thereof, within the drainpipe 12. More specifically, the safety device 10, in a noninvasive fashion, is able to monitor the level of water 11 within the drainpipe 12 to determine if there is a blockage within the drainpipe 12 that needs to be eliminated. If the water 11 reaches a predetermined level 13 within the drainpipe 12, then the safety device 10 will notify the user of the problem. By locating the obstruction within the pipe 12 at an early time, the user is able to avoid condensation overflow problems in the drain pan as identified above.

In greater detail, the safety device 10 includes a fastening or clamping body 14 having an interior surface 16 and an outer surface 18. In the embodiment illustrated in FIGS. 1-6, the interior surface 16 of the clamping body 14 has a first diameter that is slightly smaller than the drainpipe 12 to which the safety device 10 will be fastened. The clamping body 14 of this embodiment of the safety device 10 therefore has a snap-on design of a size that will allow it to be securely positioned on the desired PVC drainpipes 12 or conduit. As a result, the clamping body 14 will snugly engage a substantial portion of the outer surface of the drainpipe 12. The outer surface 18 of the clamping body 14 has a second diameter to which a safety overflow circuit housing 20 is attached. The safety overflow circuit housing 20 surrounds and protects the safety overflow circuit 22 as described herein.

Referring to FIGS. 2 and 3, the safety device 10 includes three arcuate sensor plates or pads 24a-24c that substantially extend the length of the clamping body 14. The sensor pads 24a-24c act as the metal plates of a conventional capacitor, wherein the connected outer sensor pads 24a and 24c are equivalent to one metal plate of the capacitor while the central sensor pad 24b corresponds to the opposite plate of the conventional capacitor. The sensor pads 24a, 24b and 24c are each connected to the interior surface 16 of the clamping body 14, with sensor pads 24a and 24c connected to each other while sensor pad 24b is positioned intermediate sensor pads 24a and 24c. A series of separate wires 23 are in electrical connection with the sensor pads 24a-24c at independent points 26a-26c, with the wires 23 traversing the clamping body 14 to independently connect the sensor pads 24a, 24b and 24c with the safety overflow circuit 22, as illustrated in FIGS. 6 and 7.

Continuing to view FIG. 7, the circuit diagram of the safety overflow circuit 22 is illustrated. The safety overflow circuit 22 includes a hysteresis oscillator 30 that includes an inverter 32, resistor R2, and capacitor C1. The hysteresis oscillator 30 provides an output signal to a capacitance bridge 34 that includes a resistors R3 and R5, capacitor C2, and inverters 36, 38, and 40. The input of the first inverter 36 is connected to central sensor 24b (PAD1) at node N2. The output of the first inverter 36 is connected to the cathode of diode D1 at pin 6, and the anode of diode D1 is connected to a resistor R1 and pulse detector 44 at node N4. The capacitance bridge 34 additionally includes the second inverter 38, with the input of the second inverter 38 being connected to a reference capacitor C2 and a resistor R5 at node N3. The output of the second inverter 38 is connected to the input of a third inverter 40. The output of the third inverter 40 is further connected to the cathode of a diode D5 at pin 8. Consequently, diodes D1 and D5 act as a phase detector 42, with the phase detector 42 being connected to the anode of diode D3 at node N4. The resulting signal being transmitted to a pulse detector 44 including diode D3 and resistor R4.

The safety overflow circuit 22 operates by sensing the dielectric constant of the contents within the drainpipe 12 that act as a dielectric. That is, when a dielectric material is slid between the two parallel metal plates of a conventional capacitor, the capacitance will change due to the varied dielectric constants of the various dielectric materials. The ratio of the capacitance before and after the material is placed between the two plates is equal to the dielectric constant of the center material. For reference purposes, the dielectric constant of a vacuum is 1.00, the dielectric constant of air is 1.06, the dielectric constant of conventional glass is between 7.0 and 8.0, the dielectric constant of water is 80, and the dielectric constant of titanium oxide is 170. Consequently, when water 11 is present between sensors 24a-24c, it will increase the dielectric constant of the signal inputted into the first inverter 36 as compared to the air typically present in the drainpipe 12. This large increase in the dielectric constant will result in an increase in the respective capacitance. Therefore, if water 11 fills the drainpipe 12 (as shown in FIG. 5), then the dielectric constant will be much greater than if the drainpipe 12 contains mostly air (as shown in FIG. 4). Put another way, if the dielectric constant is low, then little to no water, or an acceptable amount of water 11, is present within the drainpipe 12 at the location of the safety device 10, indicating that there are no obstructions within the drainpipe 12 at that location of safety device 10 on the drainpipe 12.

Figure 9:
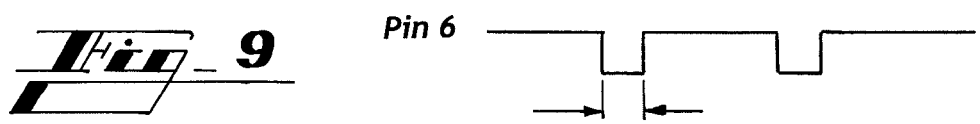
Figure 10:
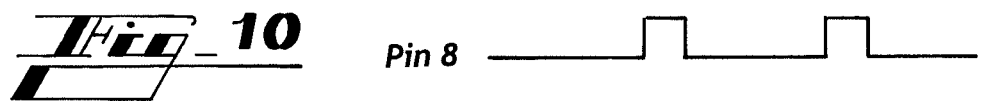

Looking to the waveforms that pass through the safety overflow circuit 22 as shown in FIGS. 9-13, the first waveform produced at pin 6 is illustrated in FIG. 9, and this variable pulse width will fluctuate as the level of water 11 in the conduit 12 changes. In comparison, the second waveform at pin 8 (as shown in FIG. 10) acts as a reference pulse that will not change. With a little water 11, the pulse at pin 6 will go low before the reference pulse goes high (as shown in FIG. 11). The first pulse is fed to diode D1 and the second pulse is fed to diode D5, and these diodes D1, D5 are connected to detect when both pulses are high. When water is near the sensor plate 24b, the capacitance increases and causes the first pulse to lengthen. When the first pulse goes into the reference pulse "high" time, an output pulse occurs and serves to turn off the output (as shown in FIG. 12). Reference capacitors must be set so that when no water 11 is present, the first pulse occurs first and, when water 11 is present, the first pulse occurs after the rising edge of the reference pulse. The reference pulse must be balanced between the on and off values as shown in FIG. 13.

Put another way, if the waveform from the third inverter 40 is the same as the waveform from the first inverter 36, then the capacitance bridge 34 generates no pulse to the pulse detector 44. If there is no pulse at the pulse detector 44, then there are no changes to the safety overflow circuit 22. However, if the waveform from the third inverter 40 is offset from the waveform of the first inverter 36 due to a change in capacitance from the sensor 24b, a pulse will be generated and transmitted to the pulse detector 44. Put another way, the pulse detector 44 will compare the waveforms from the first inverter 36 and the third inverter 40. If the waveforms are 100% of cycle time, then the input into a pulse amplifier 46 at node N5 will be low. However, if the waveform from the first inverter 36 and diode D1 is not the same as the waveform from the third inverter 40 and diode D5, a pulsed signal will be sent to the pulse amplifier 46 (which includes inverter 48).

Continuing to look at FIG. 7, the output of the inverter 48 of the pulse amplifier 46 is connected to a silicon-controlled rectifier (SCR) T1 via resistor R9, such that a pulse from the pulse amplifier 46 will turn on SCR T1. When SCR T1 is turned on, it almost creates a short over connections to sensors 24a and 24c at PAD3 and PAD4. Current is also drawn through a light emitting diode (LED) 50 to provide a visual indicator to alert observers that the water is at a high level within the drainpipe 12 and indicating that there is a blockage within the drainpipe 12. In addition to the LED 50, or as a replacement for the LED 50, another form for alerting the user may be incorporated into the safety overflow circuit 22. For example, an audible warning may be included to replace or supplement the visual warning, or a remote alarm may be added that notifies the user of a potential problem from a remote location.

Furthermore, a power supply 28, such as a 24 VAC power supply or a DC power supply, is connected to the safety overflow circuit 22 between the sensor pads 24a and 24c at PAD 3 and PAD4. The power supply 28 may be provided via power supply cord 27 as illustrated in FIG. 1. In addition, a contactor coil 52 is connected between the power supply 28 and PAD4. Looking additionally to FIG. 8, the contactor coil 52 is in electrical communication with the compressor 104. When the contactor coil 52 is energized, power will be conveyed to the compressor 104. However, when an interruption or short occurs between PAD3 and PAD4 due to the presence of water 11 in the drainpipe 12 at sensor pad 24b, the power supply 28 at the contactor coil 52 will be interrupted to the compressor 104 of the associated air conditioner 100. Consequently, when an obstruction blocks the flow of water 11 in the drainpipe 12, the safety overflow circuit 22 will disconnect the compressor 104 from the power supply 28 to deactivate the compressor 104 and thus stop additional water 11 or condensate from dripping into the drain pan from the drainpipe 12. The safety overflow circuit 22 may be reset once the user has cleared the obstruction to allow the compressor 104 to once again operate as desired. Although not illustrated, it is foreseen that a push-to-test/push-to-reset switch may be connected to the safety overflow circuit 22 and easily engaged by the user to reset the safety overflow circuit 22.

Reviewing the operation of the present invention with a conduit or drain, such as with typical air conditioning systems, the safety overflow circuit 22 uses sensor pads 24a-24c which have been made by curving the metal plates of a capacitor. As noted above, when there is little or no water 11 present inside the PVC drainpipe 12, the dielectric constant is very low; near that of air or the plastic PVC pipe. As the drainpipe 12 fills with water 11, however, the dielectric constant will increase. The safety overflow circuit 22 compares the capacitance value from the sensor to a reference value, and if that value is exceeded, the safety overflow circuit 22 disconnects the contactor coil 52 from the power 28 to turn off the AC compressor 104. In addition to the components listed above, a time delay circuit may also be incorporated into the present design, such that when a high capacitance value is detected, the safety overflow circuit 22 will delay turning off the compressor 104 until a second measurement is taken to verify the high capacitance, and confirming that there is a blockage within the drainpipe 12.

The safety overflow circuit 22 will test the level of water 11 120 times each second (at the start of each AC power cycle; 60 sets of complete positive and negative cycles). Since the safety overflow circuit 22 draws a very small fraction of an Amp, it does not cause the contactor to energize; the contactor simply passes all of the voltage to the safety overflow circuit 22. At the beginning of each AC power cycle, the line voltage is zero. As the voltage rises, the safety overflow circuit 22 will start to operate. If the safety overflow circuit 22 detects that there is no water 11 present, it will short itself out and pass the power to the load (compressor contactor). Since the switch is closed and the power consuming part of the safety overflow circuit 22 is shorted out, the safety overflow circuit 22 will not draw any power for the rest of the power cycle. If the sensor 24a-24c detects that there is water 11, the safety overflow circuit 22 will remember and test for a few more cycles to confirm that there is a blockage.

Referring to FIG. 8, the safety device 10 is designed to be easily installed in series with a thermostat 102 of an air conditioning unit 100 and a compressor contactor 104. The steps involved in installing the safety device 10 begin with the power system initially being turned off. A connector 103 that joins the thermostat 102 with the compressor 104 is cut, and the wires 105 to the safety device 10 are connected to the cut ends of the connector 103 via wire nuts 106 so that the safety device 10 is connected between the thermostat 102 and the compressor 104. With the safety device 10 away from the drainpipe 12, the safety device 10 is turned on, and the compressor 104 should operate in a normal fashion. The safety device 10 may be tested by touching the sensor 24b inside the clamp body 14, in which case the compressor 104 will shut off and a yellow light LED 50 on the safety device 10 will be illuminated. The safety device 10 may then be snapped onto, or simply connected to, a convenient location on the PVC condensate drainpipe 12 or on a pipe adapter (not illustrated) in a secondary overflow drain hole where the user predicts or suspects an occlusion may occur. If desired, the position of the safety device 10 may be secured using a wire tie (not illustrated) or some other connector around the drainpipe 12 or PVC cement.

The LED 50 on the safety device 10 is triggered by water 11 near the top of the drainpipe 12 or the center sensor plate 26b (see FIG. 5) that surpasses the predetermined level 13. When the safety device 10 has been triggered, the yellow light LED 50 will remain on and the compressor 104 will remain off until the high water condition is corrected and power 28 or thermostat 102 is cycled off then on.

Since there are no moving parts in the safety device 10, the slime and sludge buildup will not affect operation of the safety device 10 until blockage occurs within the drainpipe 12. The safety device 10 is triggered by a near full condition of the drainpipe 12, as shown in FIG. 7, and is not affected by condensation or water droplets 11 inside of the drainpipe 12. Unlike other safety switches, the present safety device 10 does not require cutting or penetration into the drainpipe 12, and does not interfere with normal fluid flow within the drainpipe 12 in any way. Consequently, the user is able to move and reposition the safety device 10 with respect to the drainpipe 12 or for use with another conduit as desired.

Although the safety device 10 has been described as used with a conventional drainpipe 12, such as a ¾ inch SCH 40 or PSI-200 PVC drainpipe 12, it is understood that the device could be used in a variety of settings in which the user wishes to monitor and eliminate any blockage within a conduit of various sizes. The safety device 10 may be attached to polyvinyl chloride (PVC), cross-linked polyvinyl chloride (cPVC), or other plastic/non-conducting rigid drain line pipe. One example of a different use of the safety device 10 is an implementation with drains or other normally not full conduits, such as a conventional sewage line (not illustrated) of a house or similar building, wherein the safety device 10 is able to monitor the fluid flow within the conduit or sewer line.

The safety device 10 detects water 11 and is not significantly affected by debris which can foul mechanical-type switches. The safety device 10 does not have moving parts or touching electrical contact points that may be subject to failure from corrosion, acid, and vibration. The safety device 10 does not require tees, penetrations or cutting into the drain line in any way. There is nowhere for system air to leak out or blow-by the switch and a vent is not normally required. The safety device 10 simply snaps onto or connects with existing PVC condensate drains. The safety device 10 is designed to work on 24VAC UL class II HVAC/R circuits which are, by their design, current limited and over current protected. The safety device 10 is wired in series with the existing contactor control circuit and adds a simple overflow switch function; critical system controls such as temperature regulation and safety limits are unaffected by proper installation of the safety device 10.

While this invention has been described with reference to preferred embodiments thereof, it is to be understood that variations and modifications can be affected within the spirit and scope of the invention as described herein and as described in the appended claim.

What is claimed is:

1. A noninvasive security device for detection of blocked fluid flow within a conduit, said security device comprising:
   a clamping body to affix substantially around the conduit; and
   a safety overflow circuit affixed to said clamping body, said safety overflow circuit including a first sensor and a second sensor, wherein said first sensor and said second sensor are positioned proximate the conduit to measure the capacitance within the conduit.

2. The security device as described in claim 1 wherein said first sensor and said second sensors are plates having a contour substantially corresponding to the shape of the conduit.

3. The security device as described in claim 1 wherein said safety overflow circuit comprises:
   a hysteresis oscillator;
   a capacitance bridge connected to said hysteresis oscillator and said first sensor, said capacitance bridge generating a reference pulse and a variable pulse;
   a phase detector connected to said capacitance bridge to compare the phase of said reference pulse and said variable pulse; and
   a pulse detector connected to said phase detector, said pulse detector receiving a signal from said phase detector when said reference pulse fluctuates from said reference pulse.

4. The safety device as described in claim 3, said capacitance bridge comprising:
   a first inverter having an input connected with one said sensor and said hysteresis oscillator and an output connected to said phase detector;
   a second inverter having an input connected to said hysteresis oscillator and an output;
   a third inverter having an input connected to said output of said second inverter and an output connected to said phase detector;

wherein said output from said first inverter is compared to said output of said third inverter at said phase detector.

5. The safety device as described in claim 4 wherein said phase detector comprise:
   a first diode connected to the output of said first inverter; and
   a second diode connected to the output of said third inverter.

6. The safety device as described in claim 3 wherein said safety overflow circuit further comprises:
   a power source connected to safety overflow circuit;
   a pulse amplifier connected to said phase detector, said pulse amplifier amplifying said signal from said phase detector;
   a silicon-controlled rectifier in electrical connection with said power source and said pulse amplifier, said pulse amplifier activating said silicon-controlled rectifier with said amplified pulse; and
   alerting means for notifying the user when said silicon-controlled rectifier is activated by said amplified pulse.

7. The safety device as described in claim 6 wherein said alerting means comprises a light emitting diode.

8. A method for monitoring the level of a fluid in a conduit comprising the steps of:
   a) providing a clamping body supporting a pair of sensors connected to a safety overflow circuit;
   b) affixing said clamping body to the conduit with said sensors proximate the conduit;
   c) monitoring a capacitance within the conduit using said sensors;
   d) determining if said capacitance exceeds a predetermined value corresponding to an excessive level of fluid in the conduit with said safety overflow circuit; and
   e) notifying the user of the excessive level of fluid in the conduit.

9. The method as described in claim 8 wherein prior to step a), comprising the step of providing arcuate sensor plates corresponding to the contour of the conduit with said clamping body.

10. The method as described in claim 8 wherein step b) further comprises:
    securing said clamping body to the conduit so that said sensors abut the conduit.

11. The method as described in claim 8 wherein step d) further comprises
    transmitting a signal from a hysteresis oscillator to a capacitance bridge;
    generating a reference pulse and a variable pulse with said capacitance bridge;
    comparing said reference pulse with said variable pulse using a phase detector; and
    selectively transmitting a pulse from said phase detector to a pulse amplifier when said reference pulse is offset from said variable pulse; and
    transmitting an amplified pulse from said pulse amplifier to disconnect the safety circuit from a power source.

12. The method as described in claim 11, wherein the step of transmitting an amplified pulse further comprises the steps of:
    activating a silicon-controlled rectifier with said amplified pulse; and
    creating a short between the connections of the safety overflow circuit to said power supply.

13. The method as described in claim 11, wherein said step of generating a reference pulse and a variable pulse further comprises:
    transmitting said variable pulse to a first inverter having an input connected to said hysteresis oscillator and to one of said sensors;
    transmitting said reference pulse to a second inverter having an input connected to said hysteresis oscillator;
    transmitting said reference pulse from said second inverter to a third inverter; and
    comparing the output of said first inverter with the output of said third inverter at said phase detector.

14. The method as described in claim 8, wherein step e) comprises the step of:
    illuminating an status light according to said sensors.

15. The method as described in claim 8, wherein step e) comprises the steps of:
    electrically connecting said safety overflow circuit to a compressor; and
    stopping the operation of the compressor if the capacitance measured between said sensors reaches a predetermined value.

16. A noninvasive security device for detection of blocked fluid flow within a drainpipe, said security device connected to a power source and comprising:
    a clamping body to engage the drainpipe;
    noninvasive sensor means for measuring a capacitance within the conduit, said sensor means positioned proximate the conduit; and
    a safety overflow circuit connected to said sensor means to measure the capacitance within the conduit, said safety overflow circuit including means for notifying a user of blocked fluid flow within the drainpipe.

17. The security device as described in claim 16, wherein said sensor means comprises:
    a first sensor plate having a contour substantially corresponding to the shape of the conduit; and
    a second sensor plate having a contour substantially corresponding to the shape of the conduit.

18. The security device as described in claim 17, said safety overflow circuit comprising:
    a hysteresis oscillator;
    a capacitance bridge connected to said hysteresis oscillator and said first sensor plate, said capacitance bridge generating a reference pulse and a variable pulse;
    a phase detector connected to said capacitance bridge to compare the phase of said reference pulse and said variable pulse; and
    a pulse detector connected to said phase detector, said pulse detector receiving a signal from said phase detector when said reference pulse fluctuates from said reference pulse.

19. The safety device as described in claim 18 wherein said safety overflow circuit further comprises:
    a pulse amplifier connected to said phase detector;
    a silicon-controlled rectifier in electrical connection with said power source and said pulse amplifier; and
    alerting means for notifying the user when the fluid flow within the conduit is obstructed, said alerting means in electrical connection with said silicon-controlled rectifier.

20. The safety device as described in claim 19 wherein said alerting means comprises a light emitting diode.

* * * * *